United States Patent [19]

Hanaoka et al.

[11] 3,969,831
[45] July 20, 1976

[54] TEACHING SYSTEM

[75] Inventors: Akio Hanaoka, Yokohama; Ken Yoshimochi, Tokyo, both of Japan

[73] Assignee: Sony Corporation, Tokyo, Japan

[22] Filed: May 13, 1974

[21] Appl. No.: 469,081

[30] Foreign Application Priority Data
May 15, 1973 Japan............................ 48-57045[U]

[52] U.S. Cl....................................... 35/8 A; 35/60; 84/470
[51] Int. Cl.²........................................... G09B 5/04
[58] Field of Search.............. 35/8 R, 8 A, 9 R, 9 A, 35/35 C, 60, 5; 360/31, 61, 62

[56] References Cited
UNITED STATES PATENTS

| | | | |
|---|---|---|---|
| 3,181,253 | 5/1965 | Candreva et al.................. | 35/9 R X |
| 3,200,516 | 8/1965 | Parker................................ | 35/35 C |
| 3,217,428 | 11/1965 | Spaulding........................... | 35/35 C |
| 3,315,375 | 4/1967 | Heinz.................................. | 35/60 X |
| 3,462,855 | 8/1969 | Cornish............................... | 35/60 |
| 3,470,785 | 10/1969 | Shallenberger et al............... | 35/5 X |
| 3,705,271 | 12/1972 | DeBell et al.......................... | 35/35 C X |

*Primary Examiner*—Richard C. Pinkham
*Assistant Examiner*—Vance Y. Hum
*Attorney, Agent, or Firm*—Hill, Gross, Simpson, Van Santen, Steadman, Chiara & Simpson

[57] ABSTRACT

A teaching system is disclosed which includes a control table made as a portable type which may be operated by a teacher and a plurality of tape recorders of a portable type which may be operated by pupils and which are connectible to the control table. Further, two or more of the control tables each of which is the same in construction and to each of which a plurality of tape recorders may be connected, are connected in parallel in accordance with the number of pupils. In this situation, it is possible by operating one of the control tables for the conversation between the teacher and pupils, and for the supplying of a teaching signal to all of the tape recorders can be achieved, and also the monitoring the learners on the tape recorders connected to the other control table by the teacher is rendered possible. Further, each of the tape recorders is formed so that it can be used as an ordinary recorder when it is disconnected from the control table.

4 Claims, 1 Drawing Figure

U.S. Patent  July 20, 1976  3,969,831
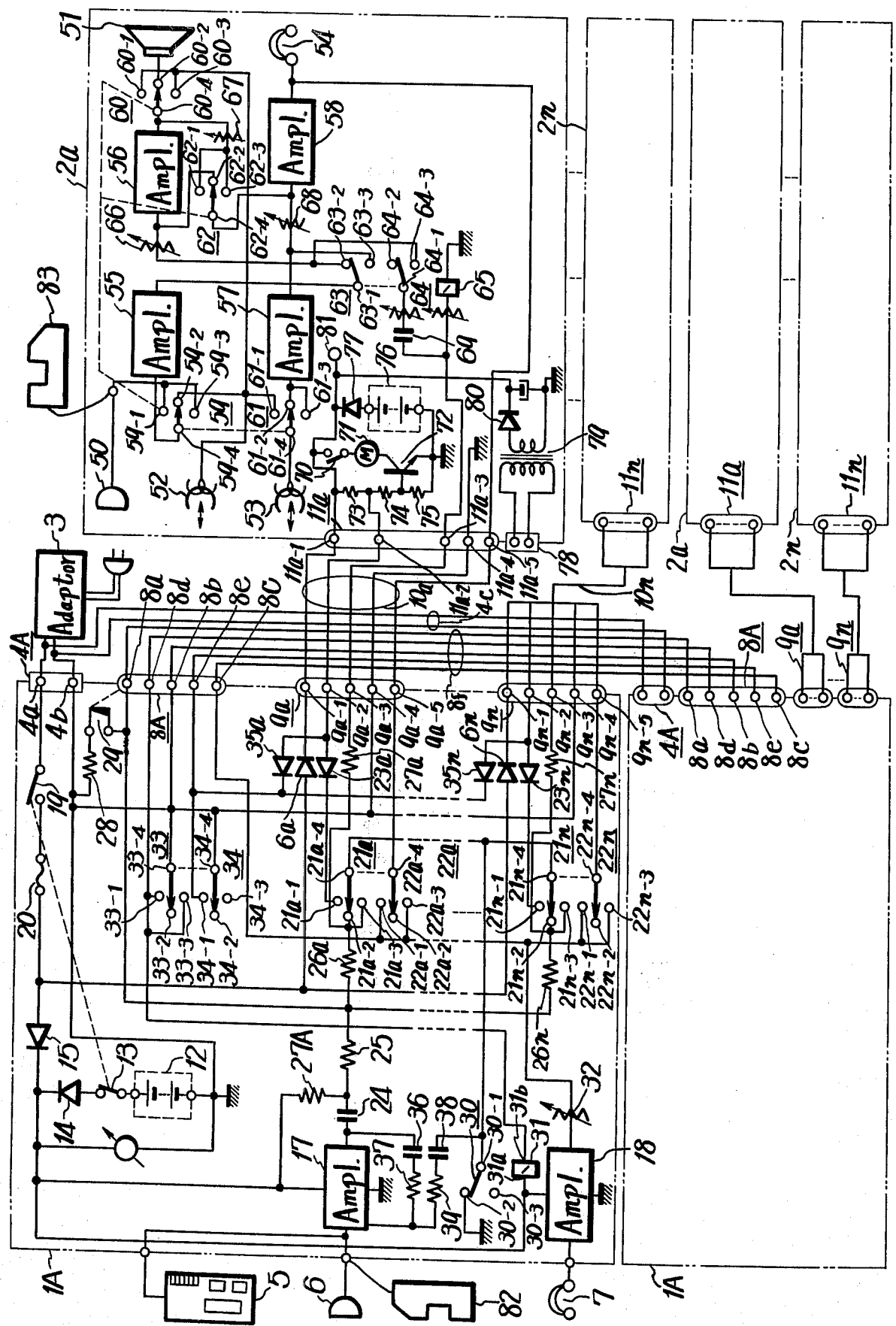

TEACHING SYSTEM

BACKGROUND OF THE INVENTION

1. Field of the Invention

The present invention relates generally to a teaching system and more particularly is directed to a teaching apparatus which is formed as a portable type as a whole and with which, after a pupil has finished his lesson according to the teaching program of the apparatus, can be used as a tape recorder independently.

2. Description of the Prior Art

A prior art teaching apparatus has been suggested which includes a control table which is operated by a teacher and a number of tape recorders which are operated by pupils, are both fixedly arranged in a room and hence cannot readily be moved.

Further, according to the prior art teaching arrangements, the number of tape recorders which can be used for a system and which can be used by the pupil is determined, it is not possible to increase or decrease the number of tape recorders as the number of pupils increase or decrease. Thus, when the number of pupils is greater than the number of tape recorders, a problem is created by the fact that some of the pupils cannot use a tape recorder, while when the number of pupils is less than the number of tape recorders, some tape recorders are not used practically, which is inefficient.

In addition, in the teaching apparatus of the prior art, since the tape recorders which are operated by pupils are fixed in a room and are not formed to be recorded on and/or reproduced from individually, if the pupil wished to learn the content of the tape at other places, he is required to use another tape recorder. This is very inconvenient.

SUMMARY OF THE INVENTION

It is an object of the present invention to provide a teaching apparatus in which a control table which may be operated by a teacher and a tape recorder which may be operated by a pupil are both arranged to be portable.

It is another object of the invention to provide a learning apparatus in which a control table, which may be operated by a teacher, is formed with terminals for a relatively small number of tape recorders and arranged as a unit, and a plurality of such control tables or units are made to be connectible and all of them can be controlled at one place to thereby correspond to the increase or decrease of the number of pupils.

It is a further object of the invention to provide a teaching apparatus in which a plurality of tape recorders, which may be operated by pupils, are made disconnectible from a control table which may be operated by a teacher and when the tape recorders are connected to the control table, they are controlled by operating the control table, but when the tape recorders are disconnected from the control table, they can operate individually as an ordinary tape recorder.

It is a yet further object of the invention to provide a teaching apparatus in which the supply of learning signals, sound signals and control signals for tape recorders (switching signals for circuits) are achieved by a common line, and the number of lines for connecting a control table to the respective tape recorders.

Other objects, features and advantages of the invention will be apparent from the description taken in conjunction with the attached drawing.

BRIEF DESCRIPTION OF THE DRAWING

The single FIGURE of the drawing is a diagrammatic connection diagram showing a preferred embodiment of the teaching apparatus according to the present invention.

DESCRIPTION OF THE PREFERRED EMBODIMENT

In the drawing, a plurality of portable control tables 1A are shown which may be operated by a teacher. A plurality of portable tape recorders $2a, \ldots 2n$ are also included which may be operated by pupils and which are connectible to the control tables 1A, respectively. Each control table 1A is supplied with DC voltage from a voltage source (not shown) through a common adaptor 3, lines 4c and terminal devices 4A, respectively. Each of the control tables 1A is connected with a tape recorder 5, a microphone 6 and ear phone 7 for the teacher, respectively, although in the illustrated embodiment the upper control table 1A is only connected with the tape recorder 5, microphone 6 and ear phone 7.

The tape recorder 5, microphone 6 and ear phone 7 for the teacher may be detachably connected to a control table 1A through, for example, plug-jack devices or the like, or may be fixed to the control tables 1A.

Each of the control tables 1A has a terminal device 8A which includes, for example, five terminals $8a$, $8b$, ... $8e$, for being connectible to another one, so that one of the control tables 1A is connected to the other one by lines $8f$ for two table connection at the corresponding terminals. However, it is also possible that a number of control tables which are similarly constructed as 1A, may be connected with one another.

Each of the control tables 1A has provided a plurality of terminal devices $9a$ to $9n$ which include terminals $9_{a-1}$, $9_{a-2}$, $9_{a-3}$, $9_{a-4}$, $9_{a-5}$, to $9_{n-1}$, $9_{n-2}$, $9_{n-3}$, $9_{n-4}$, $9_{n-5}$. The terminals $9_{a-1}$ to $9_{a-5}$ to $9_{n-1}$, $9_{n-5}$ are connected to terminals $11_{a-1}$, $11_{a-2}$, $11_{a-3}$ $11_{a-4}$, $11_{a-5}$ to $11_{n-1}$, $11_{n-5}$ (not shown) of terminal devices $11_a$ to $11_n$ of the tape recorders $2a$ to $2n$ through lines $10a$ to $10n$, respectively.

Since all the control tables 1A (in the FIGURE two control tables 1A are shown) are the same in construction, the upper control table 1A will be now described in detail, by way of example.

The control table 1A has accommodated therein a power source such, for example, as a battery 12 which is connected through a power switch 13, diodes 14, 15 for blocking reverse current and then through respective diodes $6a$ to $6n$ to the terminals $9_{a-1}$ to $9_{n-1}$ of the terminal devices $9a$ to $9n$, respectively. Further, the battery 12 is connected to an amplifier 17 for a microphone input signal and to a monitor amplifier 18. A hot side terminal $4a$ of the external power source terminal device 4A is connected to the battery 12 through a power source switch 19, a fuse 20, the diodes 15, 14 and the power switch 13.

In the control table 1A, there are also provided first, second and third switch groups, respectively. The first switch group consists of switches $21a$ to $21n$ and $22a$ to $22n$ which are ganged with one another and correspond to the terminal devices $9a$ to $9n$. The first switch group are provided for monitoring the mutual conversation between the teacher and learners or learners' learning states. The switches $21a$ to $21n$ include three fixed contacts $21_{a-1}$, $21_{a-2}$, $21_{a-3}$ to $21_{n-1}$, $21_{n-2}$, $21_{n-3}$ and movable contacts $21_{a-4}$ to $21_{n-4}$, respectively. The first fixed contacts $21_{a-1}$ to $21_{n-1}$ are for the mutual conversation and connected to the terminals $9_{a-2}$ to $9_{n-2}$ of the terminal devices $9a$ to $9n$ through diodes $23a$ to $23n$ for stopping the rotation of respective motors provided in the tape recorders $2a$ to $2n$, respectively. The second fixed contact points $21_{a-2}$ to $21_{n-2}$ are commonly connected to the output terminal of the amplifier 17 through resistors $26a$ to $26n$ for avoiding mutual interference among the tape recorders $2a$ to $2n$, a common resistor 25 for avoiding mutual interference between the two control tables 1A when they are connected, and through a common capacitor 24, to the terminals $9_{a-3}$ to $9_{n-3}$ of the terminal devices $9a$ to $9n$ through resistors $27a$ to $27n$, and to the terminal $8a$ of the terminal device 8A for two table connection, respectively.

Further, the second contact points $21_{a-2}$ to $21_{n-2}$ and third contact points $21_{a-3}$ to $21_{n-3}$ are connected together to the power source through the resistors $26a$ to $26n$, 25 and a resistor 27A for supplying DC bias. The terminal $8a$ of the terminal device 8A is connected to a ground side contact $4b$ of the power source terminal device 4A through a switch 29, which is normally closed but opened when a plug of cord side is inserted, and through a dummy resistor 28. While, the movable contacts $21_{a-4}$ to $21_{n-4}$ of the switches $21a$ to $21n$ are commonly connected and normally grounded through a switch 30, the movable contact 30-1 of which is normally in contact with its first contact 30-2 as shown in the FIGURE. The movable contact 30-1 of the switch 30 is connected with the movable contacts $21_{a-4}$ to $21_{n-4}$, as above mentioned, the first fixed contact 30-2 thereof is grounded and the second fixed contact 30-3 thereof is opened. The switch 30 is actuated by a relay 31 such that its movable contact 30-1 normally contacts with the first fixed contact 30-2 as shown in the FIGURE, but contacts with the opened fixed contact 30-3 when the relay 31 is energized.

The second switches $22a$ to $22n$ of the first switch group which are ganged with the first switches $21a$ to $21n$ include three fixed contacts $22_{a-1}$, $22_{a-2}$, $22_{a-3}$ to $22_{n-1}$, $22_{n-2}$, $22_{n-3}$ and movable contacts $22_{a-4}$ to $22_{n-4}$, respectively. The first and third fixed contacts $22_{a-1}$ to $22_{n-1}$ and $22_{a-3}$ to $22_{n-3}$ are connected together to the terminal $8c$ of the terminal device 8A and to the output terminal of the monitor amplifier 18 through a variable resistor 32. The second fixed contacts $22_{a-2}$ to $22_{n-2}$ are all made to be opened contacts. The movable contacts $22_{a-4}$ to $22_{n-4}$ are connected to the terminal $9_{a-5}$ to $9_{n-5}$ of the terminal devices $9a$ to $9n$, respectively. The terminals $9_{a-4}$ to $9_{n-4}$ of the terminal devices $9a$ to $9n$ are all ground contacts, that is, they are connected together to the ground terminal $4b$ of the terminal device 4A.

The second switch group, which include switches 33 and 34, are provided in the control table 1A for calling all pupils and for recording a program signal. The first switch 33 comprises three fixed contacts 33-1, 33-2, 33-3, and a movable contact 33-4. The movable contact 33-4 is connected to the terminal $8b$ of the terminal device 8A, to the ground terminal $4b$ of the power source terminal device 4A, and to the terminals $9_{a-4}$ to $9_{n-4}$ of the terminal devices $9a$ to $9n$. The first and third fixed contacts 33-1 and 33-3 are connected together to the terminal $8d$ of the terminal device 8A and a ground side terminal $31b$ of the relay 31 which is supplied with the power source at its input terminal $31a$. The second switch 34, which is ganged with the first switch 33, comprises three fixed contacts 34-1, 34-2, 34-3 and a movable contact 34-4. The movable contact 34-4 is connected to the terminal $8b$ of the terminal device 8A, to the ground terminal $4b$ of the power source terminal device 4A, and to the terminals $9_{a-4}$ to $9_{n-4}$ of the terminal devices $9a$ to $9n$, as in the case of the movable contact 33-4 of the first switch 33. The first fixed contact 34-1 of the switch 34 is connected to the terminals $9_{a-2}$ to $9_{n-2}$ of the terminal devices $9a$ to $9n$ through diodes $35a$ to $35n$, respectively, and to the terminal $8e$ of the terminal device 8A. The second and third contacts 34-2 an 34-3 of the second switch 34 are both made to be opened contacts, respectively.

The amplifier 17 is provied with a negative feedback circuit consisting of a capacitor 36 and a resistor 37 and also with a negative feedback circuit consisting of a capacitor 38 and a resistor 39 for avoiding level increase upon calling all the pupils between the movable contact 30-1 of the switch 30 and the amplifier 17.

The terminals $9_{a-1}$ to $9_{n-1}$ of the terminal devices $9a$ to $9n$ serve to supply electric power to the tape recorders $2a$ to $2n$ and are connected to the connection point between the fuse 20 and the diode 15 through diodes $6a$ to $6n$ for blocking a brush-noise caused by motors provided in the tape recorders $2a$ to $2n$, respectively.

The tape recorders $2a$ to $2n$ which may be connected to the control tables 1A, respectively, will be described in detail. In this case, since each of the tape recorders $2a$ to $2n$ is substantially the same in construction, the tape recorder $2a$ will be now described, by way of example.

In the tape recorder $2a$, there is arranged a microphone 50 for recording, a speaker 51 for reproducing, a recording and/or reproducing magnetic head 52 for training, a recording and/or reproducing magnetic head 53 for information to be learned, an ear phone 54, first to fourth amplifiers 55 to 58, third and fourth switch groups, respectively. Further, the terminal device $11a$, which includes the terminals $11_{a-1}$, $11_{a-2}$, $11_{a-3}$, $11_{a-4}$ and $11_{a-5}$ in correspondence with the terminals $9_{a-1}$, $9_{a-2}$, $9_{a-3}$, $9_{a-4}$ and $9_{a-5}$ of the terminal device $9a$ provided in the control table 1A, is provided in the tape recorder $2a$.

The third switch group of a pupil section includes four ganged switches 59, 60, 61 and 62 which consist of three fixed contacts 59-1 to 59-3, 60-1 to 60-3, 61-1 to 61-3 and 62-1 to 62-3 and movable contacts 5914, 60-4, 61-4 and 62-4, respectively. When the movable contacts 59-4 to 62-4 are contacted with the first fixed contacts 59-1 to 62-1, respectively, the tape recorder $2a$ is put in an ordinary recording mode; when the movable contacts 59-4 to 62-4 are contacted with the second fixed contacts 59-2 to 62-2 as shown in the FIGURE, the tape recorder $2a$ is made in a reproducing mode; and when the movable contacts 59-4 to 62-4 are contacted with the third fixed contacts 59-3 to 62-3, the tape recorder $2a$ is made in an LL-recording mode (language laboratory recording mode).

The fourth switch group of a pupil section includes two ganged switches 63 and 64 which consist of movable contacts 63-1 and 64-1 and two fixed contacts 63-2 to 63-3 and 64-2 to 64-3, respectively. The switches 63 and 64 are actuated by a relay 65. The movable contacts 63-1 and 64-1 normally contact with the first fixed contacts 63-2 and 64-2, as shown in the FIGURE, but with the second fixed contacts 63-3 and 64-3, respectively when the relay 65 is energized. The first and third fixed contacts 59-1 and 59-3 of the switch 59 are connected together to the output terminal of the microphone 50. The second fixed contact 59-2 of the switch 59 is connected to the head 52, to the first and third fixed contacts 60-1 and 60-3 of the switch 60 and to the first fixed contact 61-1 of the switch 61, respectively. The movable contact 59-4 of the switch 59 is connected to the input terminal of the amplifier 55 for amplifying the output signal of the microphone 50. The output terminal of the amplifier 55 is connected to the movable contact 63-1 of the switch 63. The first fixed contact 63-2 of the switch 63 and the second fixed contact 64-3 of the switch 64 are connected together to the input terminal of the second amplifier 56 and the second fixed contact 62-2 of the switch 62 through a variable resistor 66. The output terminal of the amplifier 56 is connected to the movable contact 60-4 of the switch 60 and to the first and third fixed contacts 62-1 and 62-3 of the switch 62 through a variable resistor 67 for avoiding crosstalk. The second fixed contact 60-2 of the switch 60 is connected to the input terminal of the speaker 51. The movable contact 61-4 of the switch 61 is connected to the head 53 and its second and third fixed contacts 61-2 and 61-3 are connected together to the input terminal of the third amplifier 57. The output terminal of the amplifier 57 is connected to the second fixed contact 63-3 of the switch 63 and also through a movable resistor 68 to the movable contact 62-4 of the switch 62 and to the input terminal of the amplifier 58 for the phone 54. The output terminal of the amplifier 58 is connected to the ear phone 54 and to the terminal $11_{a-5}$ of the terminal device 11a. The terminal $11_{a-5}$ is connected through one of the wires 10a to the terminal $9_{a-5}$ of the terminal device 9a provided in the control table 1A and therethrough to the movable contact $22_{a-4}$ of the switch 22a provided in the control table 1A. The terminal $11_{a-3}$ of the terminal device 11a is connected through another one of the wires 10a to the terminal $9_{a-3}$ of the control table 1A, to the ground through the relay 65 and to the movable contact 64-1 of the switch 64 through a capacitor 69 for blocking DC current.

A description will now be given of the power source of the tape recorder 2a. The terminal $11_{a-1}$ of the terminal device 11a is connected to the terminal $9_{a-1}$ of the terminal device 9a of the control table 1A through one of the wires 10a, so that the terminal $11_{a-1}$ is supplied with the electric power from the control table 1A. The terminal $11_{a-1}$ is grounded through a switch 70 for a motor 71 driving the tape recorder, the motor 71 and a switching transistor 72 of PNP-type. The base electrode of the transistor 72 is supplied with a bias through resistors 73, 74 and 75. The terminal $11_{a-2}$ of the terminal device 11a is connected to the connection point between the resistors 73 and 74 for bias application and to the terminal $9_{a-2}$ of the terminal device 9a provided in the control table 1A. The terminal $11_{a-4}$ of the terminal device 11a is grounded and connected to the terminal $9_{a-4}$ of the terminal device 9a through one of the wires 10a.

In the tape recorder 2a, there is provided a battery 76 one terminal of which is connected to the terminal $11_{a-1}$ through a diode 77 and the other terminal of which is grounded. An input terminal device 78 is provided in the tape recorder 2a for being supplied with the commercial electric power. A transformer 79 is connected to the input terminal device 78 at its primary winding and at its secondary winding to the ground and to the terminal $11_{a-1}$ through a rectifier 80. The terminal $11_{a-1}$ is connected to a terminal 81 for supplying electric power to the amplifiers 55 to 58. That is, the terminal 81 is connected to the power supply terminals (not shown) of the amplifiers 55 to 58.

From the above description the tape recorder 2a, it may be apparent that each of the tape recorders 2a to 2n can be used independently, if it is disconnected from the control table 1A.

The operation of one of the control tables 1A and the tape recorder 2a to 2n connected thereto will be now described.

At first, the movable conacts $21_{a-4}$ and $22_{a-4}$ of the switches 21a and 22a in the control table 1A are connected to their first fixed contacts $21_{a-1}$ and $22_{a-1}$, respectively. At this time, the base electrode of the switching transistor 72 in each of the tape recorders 2a to 2n is grounded through the resistor 74, the diode 23a, the switch 21a and the switch 30, which is held in the illustrated position, to be made nonconductive. Thus, the motor 71 in each tape recorder is stopped in rotation. At this time, since the second fixed contact $21_{a-2}$ of the switch 21a is disconnected from ground, the relay 65 in each of the tape recorders 2a to 2n is supplied with DC voltage from the control table 1A. Thus, the movable contacts 63-1 and 64-1 of the switches 63 and 64 in each of the tape recorders 2a to 2n are switched to be contacted with their second fixed contacts 63-3 and 64-3, respectively.

In this case, if the third switches 59 to 62 in each of the tape recorders 2a to 2n are in the reproducing mode, the signal from the microphone 6 for the teacher is applied to the speaker 51 in each tape recorder, while if the switches 59 to 63 are in the LL-recording mode, the signal from the microphone 6 is applied to the ear phone 54 in each tape recorder to make it possible for individual conversation between the teacher and the pupils. In this case, if the third switch group 59 to 63 of each tape recorder is switched by the pupil in the ordinary recording or LL-recording mode, the signal from the microphone 50 for the pupil in each tape recorder is applied to the ear phone 7 for the teacher through the amplifiers 55, 58 the switch 22a and the monitor amplifier 18, so that conversation between the teacher and the pupils is possible.

Next, the movable contacts $21_{a-4}$ and $22_{a-4}$ of the switches 21a and 22a in the control table 1A are contacted with the third fixed contacts $21_{a-3}$ and $22_{a-3}$, respectively. At this time, since the second and third fixed contacts $21_{a-2}$ and $21_{a-3}$ of the switch 21a are connected commonly and grounded through the switch 30, the switching transistor 72 in each tape recorder is kept conductive and the relay 65 is kept in a deenergized state. At this time, the output terminal of the amplifier 58 for the ear phone 54 in each tape recorder is connected to the ear phone 7 for the teacher through the switch 22a and monitor amplifier 18. Thus, the tape recorders corresponding to the first switches can be monitored in its using condition (training condition) by the teacher.

Next, a description will be given of the case where the switches 33 and 34 are switched so that their movable contacts 33-4 and 34-4 are contacted with their first fixed contacts 33-1 and 34-1, respectively.

In such a case, since the movable contact 33-4 of the switch 33, which is grounded, contacts the first fixed contacts 33-1, the relay 31 is energized to change the switch 30 such that its movable contact 30-1 is in contact with its opened contact 30-3. Thus, the movable contacts $21_{a-4}$ to $21_{n-4}$ of the switches $21a$ to $21n$ are disconnected from the ground.

The relay 65 in each of the tape recorders $2a$ to $2n$ is thus energized to switch the fourth switches 63 and 64 so that the signal from the microphone 6 for the teacher can be applied to the speaker 51 or ear phone 54 is each of the tape recorders $2a$ to $2n$. At this time, the movable contact 34-4 of the switch 34, which is grounded, is in contact with its first fixed contact 34-1, so that the base electrodes of the transistors 72 in the tape recorders $2a$ to $2n$ are grounded through the diodes $35a$ to $35n$ and the switch 34 to stop the rotation of the motors 71. In this state, the teacher can carry out a conversation with the pupils.

When the movable contacts 33-4 and 34-4 of the second switches 33 and 34 are switched to be contacted with their third fixed contacts 33-3 and 34-3, since the first and third fixed contacts 33-1 and 33-3 are connected in common, the relay 31 is also energized to switch the switch 30, as in the case of the movable contact 33-4 being contacted with the fixed contact 33-1, to disconnect the movable contacts $21_{a-4}$ to $21_{n-4}$ of the switches $21a$ to $21n$ from the ground. Thus, the relays 65 of the tape recorder $2a$ to $2n$ are energized to switch the switches 63 and 64. While, since the third fixed contact 34-3 of the switch 34 is opened, the switching transistors 72 of the tape recorders $2a$ to $2n$ are not made nonconductive. Accordingly, the motors 71 in the tape recorders $2a$ to $2n$ can be rotated.

At this condtion, if the tape recorders $2a$ to $2n$ are made in the ordinary recording mode and a signal to be learned is applied thereto from the tape recorder 5, the signal can be recorded through the magnetic heads 52 and 53 of the tape recorders $2a$ to $2n$, respectively. In this case, the signal is applied to the ear phone 54 of the tape recorders $2a$ to $2n$ and the signal from the microphones 50 are applied through the amplifiers 55 and 58 to the ear phone 54 thereof, so that the pupils can monitor the signal to be learned and also they can perform pronouncing or conversation training while hearing the signal to be learned.

The above description is given on the single control table 1A and the tape recorders $2a$ to $2n$ which are connectible to the single control table 1A, mainly, but other control tables 1A, to each of which one or more of the tape recorders $2a$ to $2n$ can be connectible, can be connected to the single control table 1A by connecting their terminals $8a$ to $8e$ of the terminal devices 8A, correspondingly, through the wires $8f$. In this case, each of the control tables 1A can perform the operation described above.

With the teaching system according to the present invention, if pupils are relatively few, it is sufficient that only one control table be used and the required number of tape recorders are connected to the single control table. If pupils increase beyond the number of tape recorders which could be connectible to the single control table, one or more of the control tables are connected with one another and the required number of tape recorders are connected to the control tables respecitvely to make it possible for all the pupils to learn the lesson and so on through the tape recorders connected to the control tables from one teacher who operates one of the control tables only, because the operation achieved by one of the control tables is common to the other control tables. From the same reason, a plurality of teachers, if necessary, can operate the control tables to transmit their intention to the pupils.

Also, if some of the switches of the one control table are operated, all of the pupils can be called on at the same time.

Further, with the present invention, since the transmitting of the signal to be learned and sounds and the transmitting of the control signal to the tape recorder are carried out through the common wire, the number of wires connecting the control signal with the tape recorders can be reduced to a minimum.

In the drawing, reference numeral 82 indicates an electronic musical instrument such as an electronic piano which is connected to the same terminal as that of the microphone 6 for the teacher for substantially the same purpose as the microphone 6, and 83 is an electronic musical instrument such as an electronic piano which is connected to the same terminal as the microphone 50 for the pupil, for substantially the same purpose as the microphone 50.

Although the foregoing is given as a single embodiment of the present invention, it will be apparent that many variations and modifications could be effected without departing from the spirit and scope of the novel concepts of the present invention.

We claim as our invention:

1. A teaching system comprising at least one control table having a power supply and first and second groups of switches, said first control table also including audio input and output means, student portable tape recorders which are capable of operation independently of said control table with internal power supplies as well as connected to said control table under control of said control table, said portable tape recorders including audio input and output and including transistors, a record motor in each portable tape recorder controllable by one of said transistors, a relay in each of said portable tape recorders, a plurality of electrical terminal devices at said control table with a terminal device for each of said portable tape recorders, each portable tape recorder having a terminal device which is connectible to one of said plurality of terminal devices at said control table, third and fourth groups of switches connected to said terminal devices in each tape recorder, said first group of switches controllable at said control table and connected to said one transistor to stop said record motor to interrupt operation of the tape recorder in said student tape recorder to allow two way audio communication between said control table and said student tape recorder and to also allow monitoring of the audio input and output devices of said student portable tape recorder at said control table, said second group of switches connected to said terminal devices and said relays to provide one way audio communication between said control table and said portable student tape recorder as well as independent record mode operation of said student tape recorder, said relay in each of said student tape recorders connected to said second group of switches in said control table through said terminal devices, said relays controlling the position of said fourth group of switches such that operation of said portable tape recorders can be controlled by said first and second group of switches from said control table, at least one additional control table connected to said first control table and having first and second groups of switches connected through terminal devices to the first and second groups of switches of said first control table, said first group of switches are control switches for each of said tape recorders and are connected to a terminal device and said tape recorder receives a control signal for controlling the operating mode of the said corresponding tape recorder and receives a teaching signal source, a microphone for supplying a teaching signal to said tape recorder and for paging a pupil, said second group of switches connectable in parallel with other second group switches provided in the other control table, a common control terminal connected directly to said first and additional control tables for controlling the mode of all of said tape recorders at the same time, a common supply terminal directly connectible between said teaching signal source and said microphone and said supply terminals for supplying said teaching signal to all said tape recorders at the same time and for calling all pupils at the same time, and a common receiving terminal which is connectible with other common receiving terminals and connectible through other first control switches with corresponding other tape recorders.

2. A teaching system according to claim 1 including a third control table connected to said first and additional control table and having a first and second groups of switches interconnected through terminal devices to the first and second groups of switches of said first and additional control tables to control said portable tape recorders.

3. A teaching system according to claim 2 including third portable student tape recorders connected to said additional control table.

4. A teaching system according to claim 1 wherein said first control table has an external power supply to which said portable student tape recorder is connectible.

* * * * *